United States Patent
Ho et al.

(10) Patent No.: US 11,574,048 B2
(45) Date of Patent: Feb. 7, 2023

(54) HARDWARE TROJAN IMMUNITY DEVICE AND OPERATION METHOD THEREOF

(71) Applicant: VIA LABS, INC., New Taipei (TW)

(72) Inventors: Ying-Chieh Ho, New Taipei (TW); Chin-Hao Yang, New Taipei (TW); Teng-Yen Tang, New Taipei (TW)

(73) Assignee: VIA LABS, INC., New Taipei (TW)

( * ) Notice: Subject to any disclaimer, the term of this patent is extended or adjusted under 35 U.S.C. 154(b) by 265 days.

(21) Appl. No.: 16/892,304

(22) Filed: Jun. 4, 2020

(65) Prior Publication Data

US 2021/0271754 A1  Sep. 2, 2021

(30) Foreign Application Priority Data

Feb. 27, 2020 (TW) .................................. 109106408

(51) Int. Cl.
*G06F 21/55* (2013.01)
(52) U.S. Cl.
CPC ...... *G06F 21/554* (2013.01); *G06F 2221/034* (2013.01)
(58) Field of Classification Search
CPC .. G06F 21/554; G06F 2221/034; G06F 21/85; G06F 21/76; G06F 11/3003; G06F 21/75
See application file for complete search history.

(56) References Cited

U.S. PATENT DOCUMENTS

| 8,213,313 | B1 * | 7/2012 | Doiron | .................. | H04L 43/028 370/254 |
|---|---|---|---|---|---|
| 2017/0366288 | A1 * | 12/2017 | Yokota | ..................... | H04J 14/00 |
| 2018/0089426 | A1 * | 3/2018 | Shi | .......................... | G06F 21/76 |
| 2018/0137290 | A1 | 5/2018 | Kwiat et al. | | |

FOREIGN PATENT DOCUMENTS

| CN | 108446555 | 8/2018 |
|---|---|---|
| CN | 110830986 | 2/2020 |
| TW | 201203108 | 1/2012 |

OTHER PUBLICATIONS

Giridharan et al, "A MUX based Latch Technique for the detection of Hardware Trojan using Path Delay Analysis", 2021, 2021 IEEE International Conference on Electronics, Computer and Communication Technologies, p. 1-4.*
"Office Action of Taiwan Counterpart Application", dated Feb. 3, 2021, p. 1-p. 23.

* cited by examiner

*Primary Examiner* — Christopher A Revak
(74) *Attorney, Agent, or Firm* — JCIPRNET

(57) ABSTRACT

A hardware Trojan immunity device and an operation method thereof are provided. The hardware Trojan immunity device is disposed in a data transmission path between an output terminal of a first circuit and an input terminal of a second circuit. The hardware Trojan immunity device includes a multiplexer, an arbitrary pattern generator (APG) and a monitoring circuit. A first input terminal of the multiplexer is coupled to the output terminal of the first circuit. An output terminal of the multiplexer is coupled to the input terminal of the second circuit. The APG is coupled to a second input terminal of the multiplexer to provide pseudo-random data. The monitoring circuit is coupled to a control terminal of the multiplexer. The monitoring circuit is configured to monitor a data activity of the data transmission path and to control a routing of the multiplexer according to the data activity.

18 Claims, 7 Drawing Sheets

HARDWARE TROJAN IMMUNITY DEVICE AND OPERATION METHOD THEREOF

CROSS-REFERENCE TO RELATED APPLICATION

This application claims the priority benefit of Taiwan application no. 109106408, filed on Feb. 27, 2020. The entirety of the above-mentioned patent application is hereby incorporated by reference herein and made a part of this specification.

TECHNICAL FIELD

The invention relates to an electronic circuit, and more particularly, to a hardware Trojan immunity device and an operation method thereof.

BACKGROUND

With the development of electronic circuits, the complexity of circuits in integrated circuits is getting higher. Integrated circuits may include intellectual property core (also known as "silicon intellectual property" in Chinese) or a process service (design service) integrated system chip. It is already common for integrated circuits to include third party circuits. However, any data transmission path using (or via) a third-party silicon intellectual property may have electronic security issues.

For example, the third-party silicon intellectual property may be pre-embedded with a hardware Trojan (a circuit with spy function). In an operation with highly computationally intensive (a normal operation mode), it is difficult for the hardware Trojan implanted in a circuit module to openly steal data in an encrypted environment of the normal operation mode. In an operation with low data activity rate (e.g., a standby mode), there is not much data transmission in the data transmission path. In general, a data activity in the standby mode is lower (to save power). Moreover, the system may not pay much attention to (does not care) a logic state of the data transmission path in the standby mode. Therefore, the hardware Trojan is likely to steal data in the standby mode.

It should be noted that, the content in the paragraph "Description of Related Art" are intended to assist understanding the invention. Part of the content (or all content) disclosed in the paragraph "Description of Related Art" may not be the conventional technology known by a person of ordinary skill in the art. The content disclosed in the paragraph "Description of Related Art" may not mean the content is known by a person of ordinary skill in the art before application of the invention.

SUMMARY

The invention provides a hardware Trojan immunity device and an operation method thereof to maintain the security of data.

The hardware Trojan immunity device of the invention is disposed in a data transmission path between an output terminal of a first circuit and an input terminal of a second circuit. The hardware Trojan immunity device includes a multiplexer, an arbitrary pattern generator (APG) and a monitoring circuit. A first input terminal of the multiplexer is configured to be coupled to the output terminal of the first circuit. An output terminal of the multiplexer is configured to be coupled to the input terminal of the second circuit. The APG is coupled to a second input terminal of the multiplexer to provide pseudo-random data. The monitoring circuit is coupled to a control terminal of the multiplexer. The monitoring circuit is configured to monitor a data activity of the data transmission path and to control a routing of the multiplexer according to the data activity.

The operation method of the invention includes: monitoring a data activity of the data transmission path by a monitoring circuit; providing pseudo-random data by an arbitrary pattern generator; and controlling a routing of a multiplexer by the monitoring circuit according to the data activity. A first input terminal of the multiplexer is configured to be coupled to the output terminal of the first circuit. A second input terminal of the multiplexer is coupled to the arbitrary pattern generator to receive the pseudo-random data. An output terminal of the multiplexer is configured to be coupled to the input terminal of the second circuit.

Based on the above, according to the embodiments of the invention, the monitoring circuit is used to monitor the data activity of the data transmission path. For instance, when an abnormal activity occurs on the data transmission path, the monitoring circuit may control the multiplexer to cut off the data transmission path and to provide the pseudo-random data to the input terminal of the second circuit. Accordingly, the hardware Trojan immunity device can maintain data security. When the abnormal activity does not occur on the data transmission path, the monitoring circuit may control the multiplexer to turn on the data transmission path. Accordingly, the hardware Trojan immunity device will not affect a data transmission of the data transmission path between the first circuit and the second circuit.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
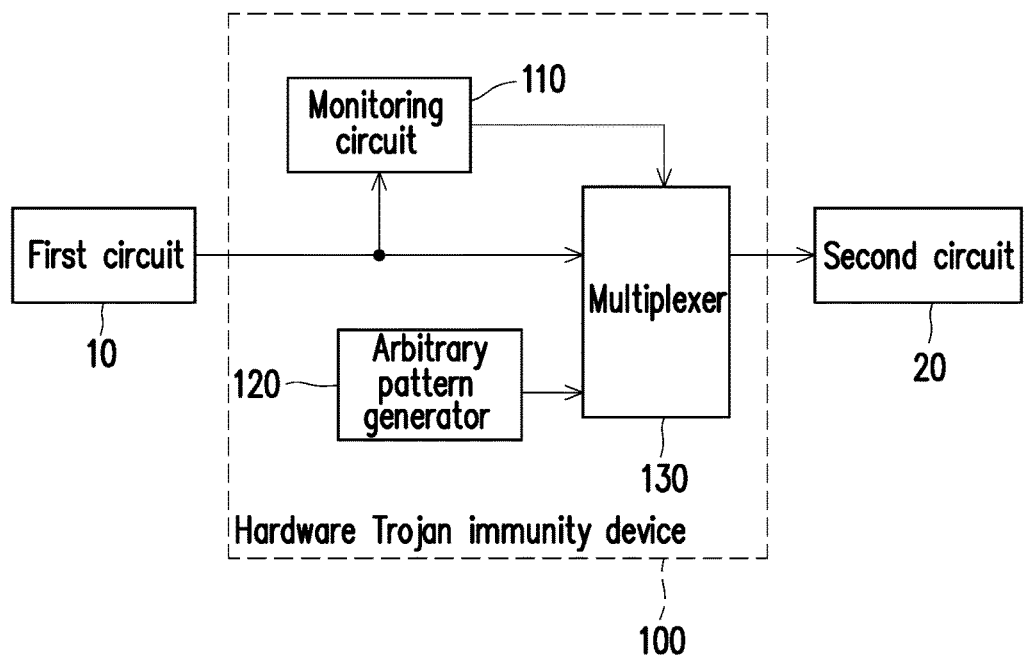
FIG. 1 is a circuit block diagram of a hardware Trojan immunity device according to an embodiment of the invention.

The term "coupled (or connected)" used in this specification (including claims) may refer to any direct or indirect connection means. For example, "a first device is coupled (connected) to a second device" should be interpreted as "the first device is directly connected to the second device" or "the first device is indirectly connected to the second device through other devices or connection means". The terms such as "first", "second" and the like as recited in full text of the specification (including claims) are intended to give the elements names or distinguish different embodiments or scopes, and are not intended to limit an upper limit or a lower limit of the number of the elements nor limit an order of the elements. Moreover, wherever possible, elements/components/steps with same reference numerals represent same or similar parts in the drawings and embodiments. Elements/components/steps with the same reference numerals or names in different embodiments may be cross-referenced.

FIG. 1 is a circuit block diagram of a hardware Trojan immunity device 100 according to an embodiment of the invention. The hardware Trojan immunity device 100 depicted in FIG. 1 is disposed in a data transmission path between an output terminal of a first circuit 10 and an input terminal of a second circuit 20. Implementation details of the first circuit 10 and the second circuit 20 are not particularly limited in this embodiment. Based on design requirements, in some application examples, the first circuit 10 may be an input pad and/or an input circuit of an integrated circuit, and the second circuit 20 may be a functional circuit of the integrated circuit. In other application examples, the first circuit 10 may be a functional circuit of an integrated circuit, and the second circuit 20 may be an output pad and/or an output circuit of the integrated circuit. In some other application examples, the hardware Trojan immunity device 100 may be disposed in the intellectual property rights core (also referred to as "silicon intellectual property" in Chinese). The first circuit 10 may be a macro circuit of silicon intellectual property, and the second circuit 20 may be another macro circuit of silicon intellectual property.

In yet some other application examples, the hardware Trojan immunity device 100 may be disposed in a universal serial bus hub (USB Hub). When a host communicates with devices through the USB hub, if the USB hub does not have any protection or shielding mechanism, the hardware Trojan in the host (or the devices) may steal data or perform other attacks. When the hardware Trojan immunity device 100 is disposed in a USB hub, the hardware Trojan immunity device 100 can automatically start and monitor a data activity of a data transmission path between the host and the devices during standby. Once the hardware Trojan immunity device 100 determines that there are possible Trojan implantations or security problems, the hardware Trojan immunity device 100 can immediately block the data transmission path between the host and the devices and send out interference signals.

In the embodiment depicted in FIG. 1, the hardware Trojan immunity device 100 includes a monitoring circuit 110, an arbitrary pattern generator (APG) 120 and a multiplexer 130. The output terminal of the first circuit 10 is coupled to a first input terminal of the multiplexer 130. An output terminal of the multiplexer 130 may be coupled to the input terminal of the second circuit 20. Under normal circumstances, the first input terminal of the multiplexer 130 may be selectively coupled to the output terminal of the multiplexer 130. That is, the multiplexer 130 may turn on (maintain) the data transmission path between the first circuit 10 and the second circuit 20. Once an abnormal activity occurs, the multiplexer 130 may cut off the original data transmission path.

Figure 2:
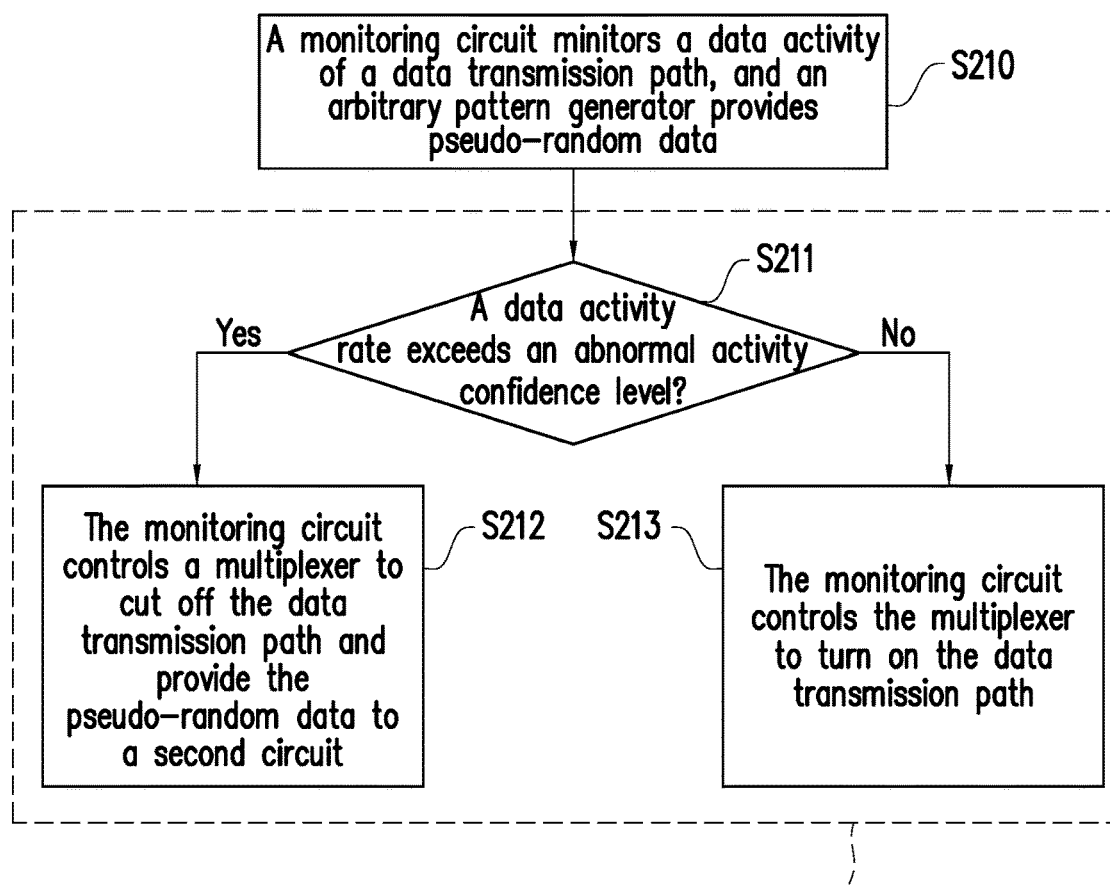
FIG. 2 is a flowchart of an operation method of a hardware Trojan immunity device according to an embodiment of the invention.

FIG. 2 is a flowchart of an operation method of a hardware Trojan immunity device according to an embodiment of the invention. Referring to FIG. 1 and FIG. 2, an output terminal of the arbitrary pattern generator 120 is coupled to a second input terminal of the multiplexer 130. In step S210, the arbitrary pattern generator 120 may provide pseudo-random data or pseudo-random numbers to the second input terminal of the multiplexer 130. For instance, the arbitrary pattern generator 120 may provide a pseudo randomness binary sequence (PRBS) to the multiplexer 130. The arbitrary pattern generator 120 may provide different data types to the multiplexer 130 based on system requirements. When the transmission of the data transmission path is abnormal, the arbitrary pattern generator 120 may use different data types to generate invalid data (pseudo-random data) to deceive the Trojan based on system requirements, so as to gain more time to protect the system.

Figure 3:
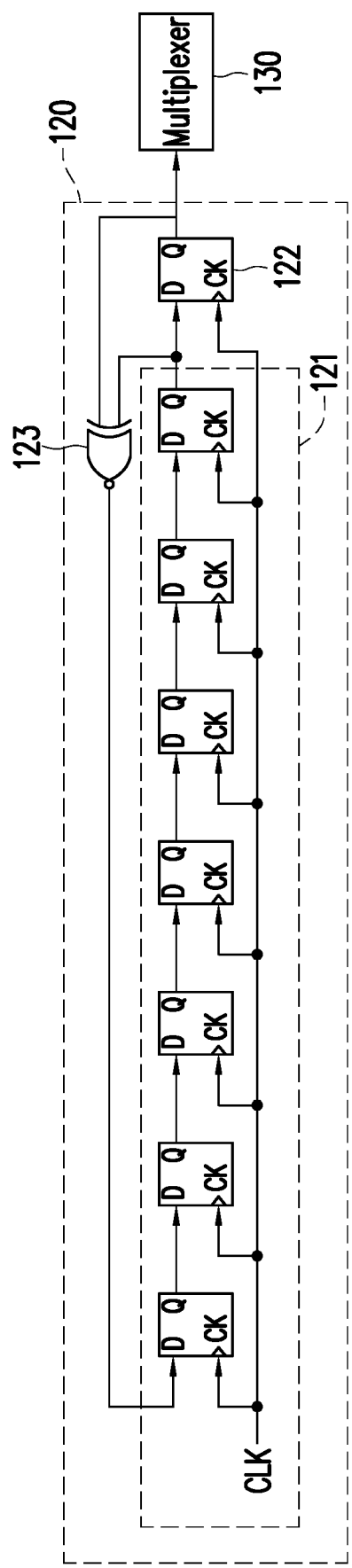
FIG. 3 is a circuit block diagram of the arbitrary pattern generator depicted in FIG. 1 according to an embodiment of the invention.

Implementation details of the arbitrary pattern generator 120 are not particularly limited in this embodiment. For instance, FIG. 3 is a circuit block diagram of the arbitrary pattern generator 120 depicted in FIG. 1 according to an embodiment of the invention. The arbitrary pattern generator 120 depicted in FIG. 3 includes a flip-flop string 121, a flip-flop 122 and an XNOR gate 123. A clock terminal of the flip-flop string 121 and a clock terminal of the flip-flop 122 receive a clock signal CLK. A data input terminal of the flip-flop 122 is coupled to a data output terminal of the flip-flop string 121. A data output terminal of the flip-flop 122 outputs the pseudo-random data to the second input terminal of the multiplexer 130. An output terminal of the XNOR gate 123 is coupled to a data input terminal of the flip-flop string 121. A first input terminal of the XNOR gate 123 is coupled to the data output terminal of the flip-flop 122. A second input terminal of the XNOR gate 123 is coupled to the data output terminal of the flip-flop string 121. Based on design requirements, in other application examples, the arbitrary pattern generator 120 may be a conventional pseudo random number generator or other random number generating device.

Referring to FIG. 1 and FIG. 2, in step S210, the monitoring circuit 110 may monitor a data activity of a data transmission path between the first circuit 10 and the second circuit 20. The monitoring circuit 110 is coupled to a control terminal of the multiplexer 130. In step S220, the monitoring circuit 110 may control a routing of the multiplexer 130 according to a data activity of the data transmission path. For instance, the monitoring circuit 110 may monitor a data activity rate of the output terminal of the first circuit 10.

In the embodiment depicted in FIG. 2, step S220 includes step S211, step S212 and step S213. The monitoring circuit 110 may determine whether the data activity rate of the data transmission path exceeds an abnormal activity confidence level in step S211. The abnormal activity confidence level may be determined based on design requirements. When the data activity rate of the data transmission path exceeds the abnormal activity confidence level (the determination result of step S211 is "Yes"), the monitoring circuit 110 may perform step S212. In step S212, the monitoring circuit 110 may control the multiplexer 130 to cut off the data transmission path between the first circuit 10 and the second circuit 20 and to provide the pseudo-random data of the arbitrary pattern generator 120 to the input terminal of the second circuit 20 instead. In addition, the monitoring circuit 110 may send a warning to the system with a flag in step S212 to enable the system to switch to a protection mode and to start a system-level protection mechanism. When the data activity rate of the data transmission path is lower than the abnormal activity confidence level (the determination result of step S211 is "No"), the monitoring circuit 110 may perform step S213. In step S213, the monitoring circuit 110 may control the multiplexer 130 to turn on the data transmission path between the first circuit 10 and the second circuit 20.

In other words, when a data transmission amount of the data transmission path between the first circuit 10 and the second circuit 20 is a legal (normal) data amount, the multiplexer 130 may selectively couple the output terminal of the first circuit 10 to the input terminal of the second circuit 20. When a hardware Trojan steals data and causes the data transmission amount of the data transmission path to become larger (an abnormal data amount), the multiplexer 130 may selectively couple the output terminal of the arbitrary pattern generator 120 to the input terminal of the second circuit 20, so as to cut off the data transmission path between the first circuit 10 and the second circuit 20 and to provide the pseudo-random data to the input terminal of the second circuit 20.

Figure 4:
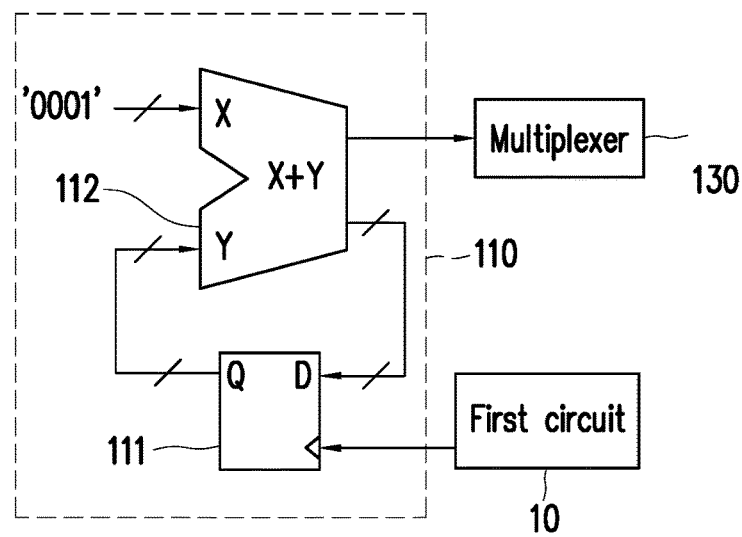
FIG. 4 is a circuit block diagram of the monitoring circuit depicted in FIG. 1 according to an embodiment of the invention.

Implementation details of the monitoring circuit 110 are not particularly limited by this embodiment. For instance, FIG. 4 is a circuit block diagram of the monitoring circuit 110 depicted in FIG. 1 according to an embodiment of the invention. The monitoring circuit 110 depicted in FIG. 4 includes a flip-flop 111 and an addition circuit 112. A trigger terminal of the flip-flop 111 may be coupled to the output terminal of the first circuit 10. A first input terminal of the addition circuit 112 may receive a step value. The step value may be determined based on the design requirements. For instance, the step value may be any fixed real number. In the embodiment depicted in FIG. 4, the step value may be an integer "0001". A second input terminal of the addition circuit 112 is coupled to a data output terminal Q of the flip-flop 111. An output terminal of the addition circuit 112 is coupled to a data input terminal D of the flip-flop 111. An overflow terminal of the addition circuit 112 is coupled to the control terminal of the multiplexer 130. Taking a four-bit accumulator (the monitoring circuit 110) as an example, as long as the data has the abnormal activity during standby, it will accumulate the number of times that the abnormal activity occurs. Once the number of times is accumulated to 16 times, the data transmission path between the first circuit 10 and the second circuit 20 may be determined as being abnormal. Accordingly, the monitoring circuit 110 may immediately activate a data shielding mechanism (cutting off the data transmission path between the first circuit 10 and the second circuit 20) to protect the system.

Figure 5:
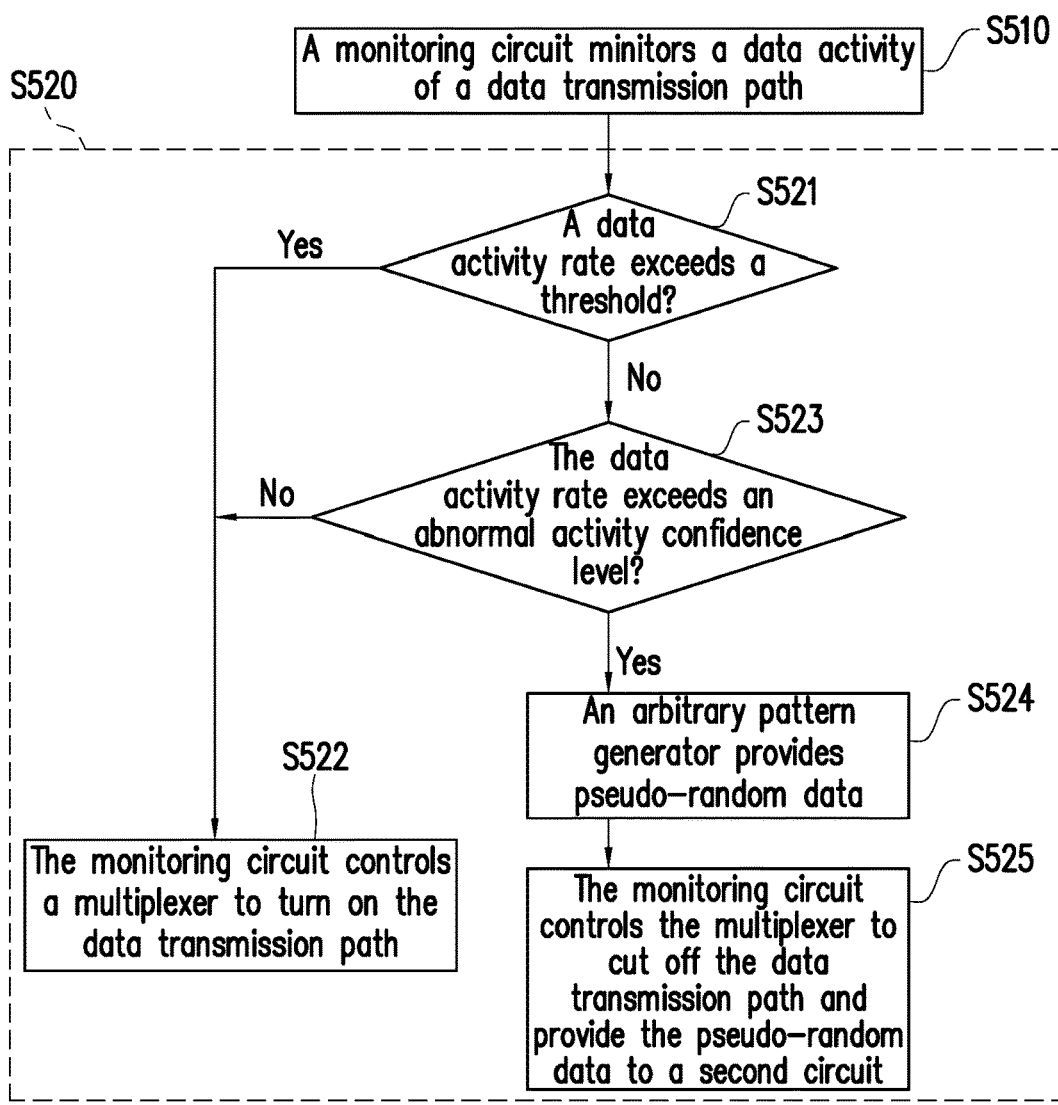
FIG. 5 is a flowchart of an operation method of a hardware Trojan immunity device according to another embodiment of the invention.

FIG. 5 is a flowchart of an operation method of a hardware Trojan immunity device according to another embodiment of the invention. Referring to FIG. 1 and FIG. 5, in step S510, the monitoring circuit 110 may monitor a data activity of a data transmission path between the first circuit 10 and the second circuit 20. In step S520, the monitoring circuit 110 may control a routing of the multiplexer 130 according to the data activity of the data transmission path. For instance, the monitoring circuit 110 may monitor a data activity rate of the output terminal of the first circuit 10.

In the embodiment depicted in FIG. 5, step S520 includes step S521, step S522, step S523, step S524 and step S525. The monitoring circuit 110 may determine whether a data activity rate of the data transmission path between the first circuit 10 and the second circuit 20 exceeds a threshold in step S521. The threshold may be determined based on the design requirements. When the data activity rate of the data transmission path between the first circuit 10 and the second circuit 20 exceeds the threshold (the determination result of step S521 is "Yes"), the monitoring circuit 110 may perform step S522. In step S522, the monitoring circuit 110 may control the multiplexer 130 to turn on the data transmission path between the first circuit 10 and the second circuit 20.

In other words, by monitoring the data transmission amount of the data transmission path between the first circuit 10 and the second circuit 20, the monitoring circuit 110 may determine whether an operation mode of the system is a normal operation mode or a standby mode. When the data activity rate of the data transmission path between the first circuit 10 and the second circuit 20 exceeds the threshold, the monitoring circuit 110 may determine that the operation mode of the system is the normal mode. In general, in an operation with massive transmitted data (the normal operation mode), it is difficult for a hardware Trojan implanted in a circuit module to openly steal data in an encrypted environment of the normal operation mode.

When the data activity rate of the data transmission path between the first circuit 10 and the second circuit 20 does not exceed the threshold (the determination result of step S521 is "No"), the monitoring circuit 110 may perform step S523. In step S523, the monitoring circuit 110 may determine whether a data activity rate of the data transmission path between the first circuit 10 and the second circuit 20 exceeds an abnormal activity confidence level. When the data activity rate of the data transmission path is lower than the abnormal activity confidence level (the determination result of step S523 is "No"), the monitoring circuit 110 may perform step S522. Step S523 and step S522 depicted in FIG. 5 may be deduced by analogy with reference to related description of step S221 and step S223 depicted in FIG. 2, which is not repeated hereinafter.

When the data activity rate of the data transmission path between the first circuit 10 and the second circuit 20 is lower than the threshold and exceeds the abnormal activity confidence level (the determination result of step S523 is "Yes"), the monitoring circuit 110 may perform step S524. In step S524, the arbitrary pattern generator 120 may provide pseudo-random data (or pseudo-random numbers) to the second input terminal of the multiplexer 130. In step S525, the monitoring circuit 110 may control the multiplexer 130 to cut off the data transmission path between the first circuit 10 and the second circuit 20 and to provide the pseudo-random data of the arbitrary pattern generator 120 to the input terminal of the second circuit 20.

Figure 6:
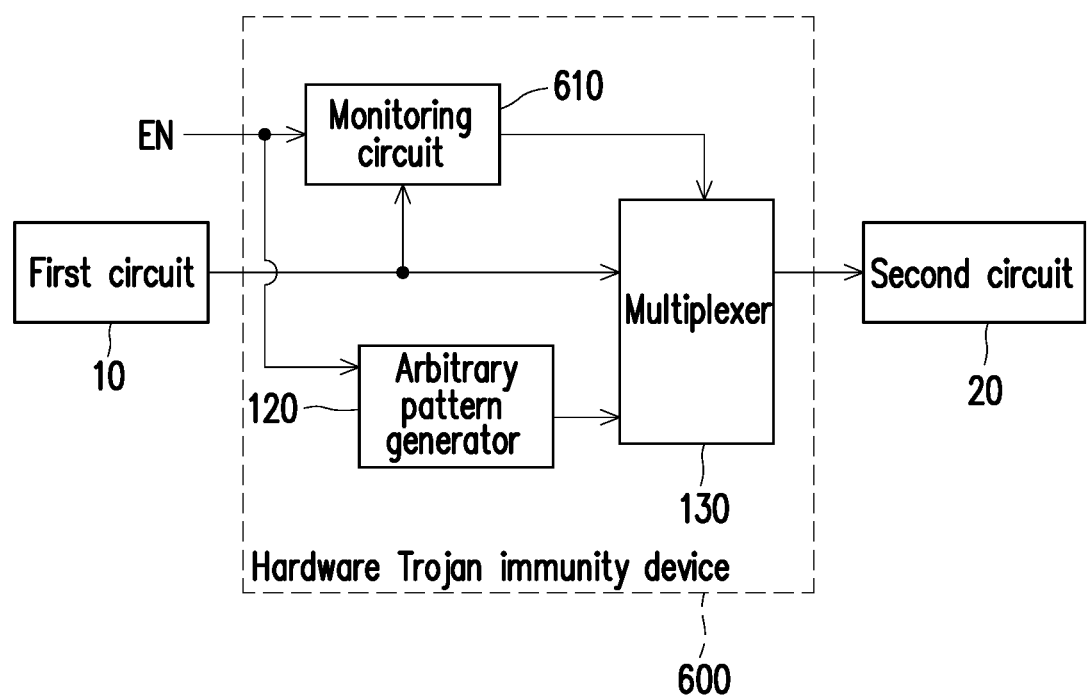
FIG. 6 is a circuit block diagram of a hardware Trojan immunity device according to another embodiment of the invention.

FIG. 6 is a circuit block diagram of a hardware Trojan immunity device 600 according to another embodiment of the invention. The hardware Trojan immunity device 600 depicted in FIG. 6 includes a monitoring circuit 610, an arbitrary pattern generator (APG) 120 and a multiplexer 130. The hardware Trojan immunity device 600, the monitoring circuit 610, the arbitrary pattern generator 120 and the multiplexer 130 depicted in FIG. 6 may be deduced by analogy with reference to the related description of the hardware Trojan immunity device 100, the monitoring circuit 110, the arbitrary pattern generator 120 and the multiplexer 130 depicted in FIG. 1, which is not repeated hereinafter. In the embodiment depicted in FIG. 6, the monitoring circuit 610 may receive an enable signal EN from a system. The monitoring circuit 610 and the arbitrary pattern generator 120 are controlled by the enable signal EN.

Figure 7:
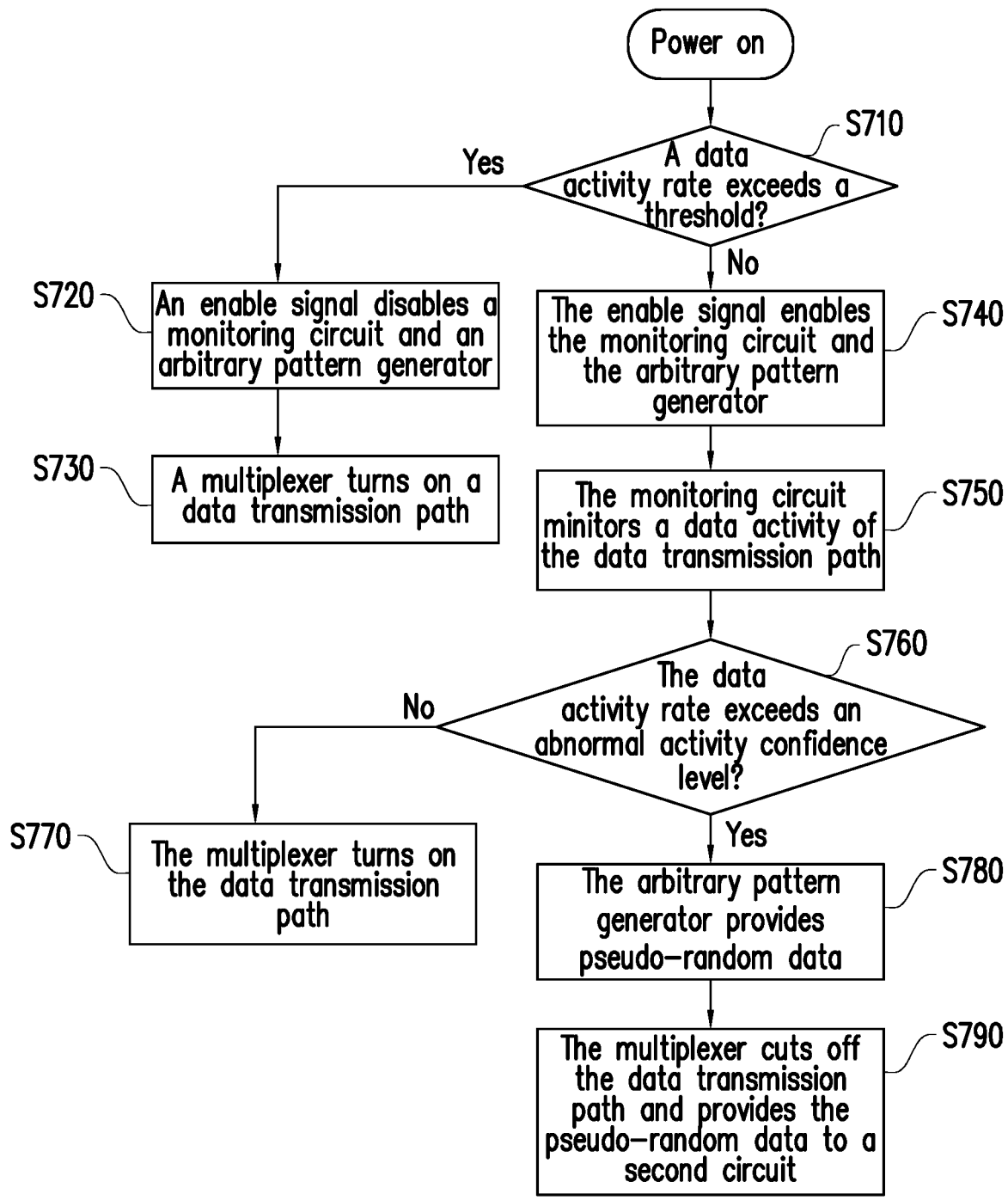
FIG. 7 is a flowchart of an operation method of a hardware Trojan immunity device according to yet another embodiment of the invention.

FIG. 7 is a flowchart of an operation method of a hardware Trojan immunity device according to yet another embodiment of the invention. Referring to FIG. 6 and FIG. 7, when the data activity rate of the data transmission path between the first circuit 10 and the second circuit 20 exceeds the threshold (the determination result of step S710 is "Yes"), the monitoring circuit 110 may perform the step S720. In step S720 (e.g., the system is the normal operation mode), the monitoring circuit 610 and the arbitrary pattern generator 120 are disabled by the enable signal EN. When the monitoring circuit 610 is disabled, the multiplexer 130 may turn on the data transmission path between the first circuit 10 and the second circuit 20 (step S730).

When the data activity rate of the data transmission path between the first circuit 10 and the second circuit 20 is lower than the threshold (the determination result of step S710 is "No"), the monitoring circuit 610 may perform step S740. In step S740, the monitoring circuit 610 and the arbitrary pattern generator 120 are enabled by the enable signal EN. After the monitoring circuit 610 is enabled, the monitoring circuit 610 may perform step S750, step S760, step S770 and step S790. After the arbitrary pattern generator 120 is enabled, the arbitrary pattern generator 120 may perform step S780. Step S750, step S760, step S770, step S780 and step S790 depicted in FIG. 7 may be deduced by analogy with reference to related description of step S510, step S523, step S522, step S524 and step S525 depicted in FIG. 5, which is not repeated hereinafter.

Figure 8:
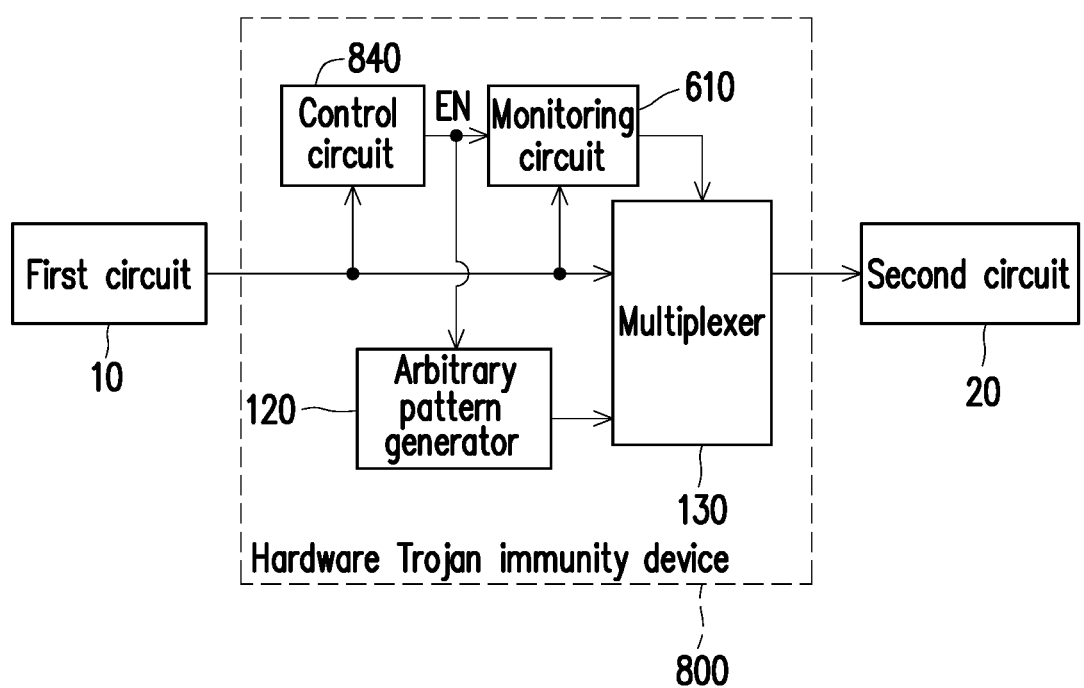
FIG. 8 is a circuit block diagram of a hardware Trojan immunity device according to yet another embodiment of the invention.

FIG. 8 is a circuit block diagram of a hardware Trojan immunity device 800 according to yet another embodiment of the invention. The hardware Trojan immunity device 800 depicted in FIG. 8 includes a monitoring circuit 610, an arbitrary pattern generator (APG) 120, a multiplexer 130 and a control circuit 840. The hardware Trojan immunity device 800, the monitoring circuit 610, the arbitrary pattern generator 120 and the multiplexer 130 depicted in FIG. 8 may be deduced by analogy with reference to the related description of the hardware Trojan immunity device 600, the monitoring circuit 610, the arbitrary pattern generator 120 and the multiplexer 130 depicted in FIG. 6, which is not repeated hereinafter. In the embodiment depicted in FIG. 8, the monitoring circuit 610 may receive an enable signal EN from the control circuit 840. The monitoring circuit 610 and the arbitrary pattern generator 120 are controlled by the enable signal EN. In the embodiment depicted in FIG. 8, the control circuit 840 is coupled to an enable terminal of the monitoring circuit 610. The control circuit 840 may monitor a data activity of a data transmission path between the first circuit 10 and the second circuit 20.

Figure 9:
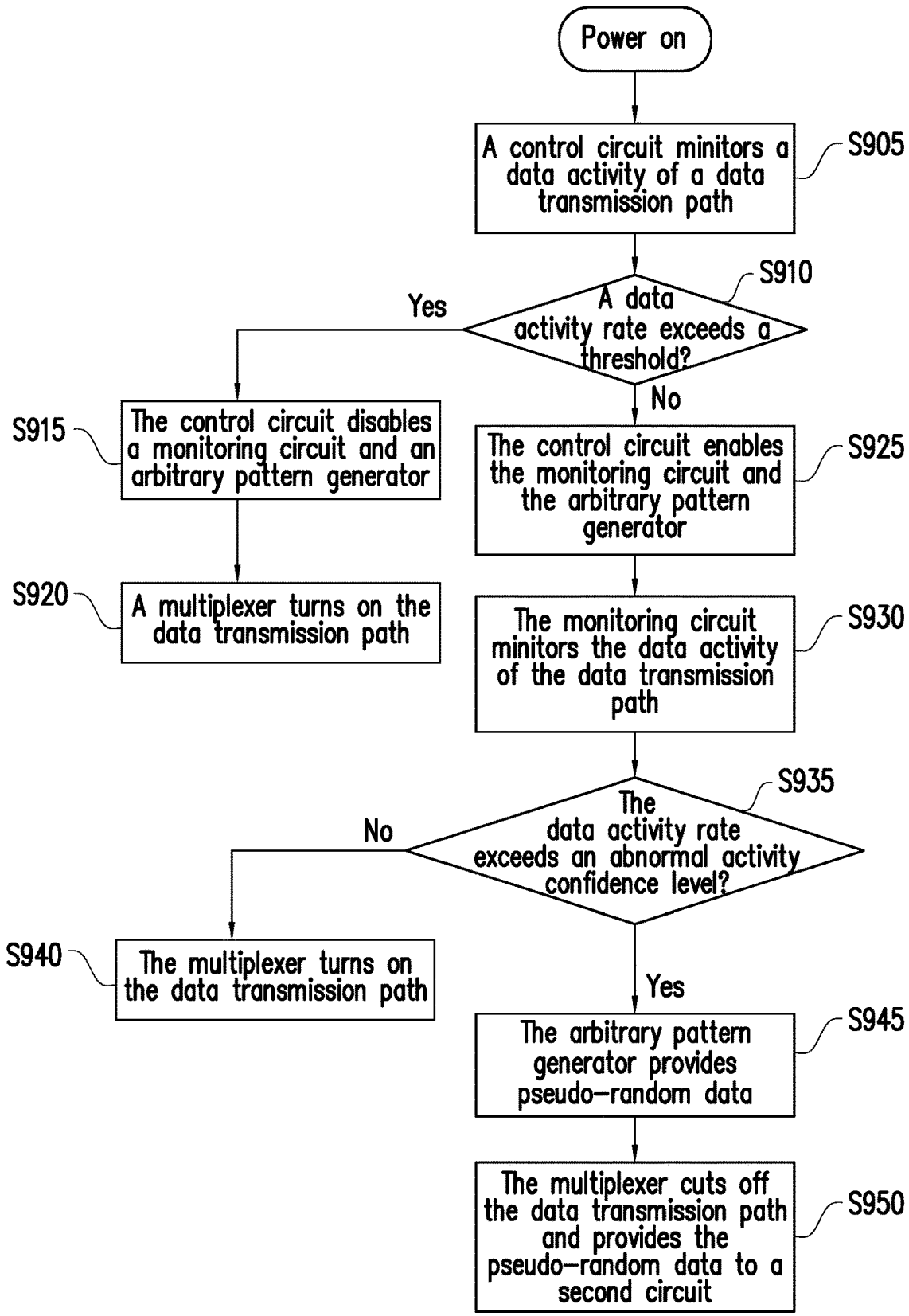
FIG. 9 is a flowchart of an operation method of a hardware Trojan immunity device according to still another embodiment of the invention.

FIG. 9 is a flowchart of an operation method of a hardware Trojan immunity device according to still another embodiment of the invention. Referring to FIG. 8 and FIG. 9, in step S905, the control circuit 840 may monitor a data activity of a data transmission path between the first circuit 10 and the second circuit 20. The control circuit 840 may control the monitoring circuit 610 according to the data activity of the data transmission path between the first circuit 10 and the second circuit 20. When the data activity rate of the data transmission path between the first circuit 10 and the second circuit 20 exceeds the threshold (the determination result of step S910 is "Yes"), the control circuit 840 may perform step S915. In step S915 (e.g., the system is the normal operation mode), the control circuit 840 may disable the monitoring circuit 610 and the arbitrary pattern generator 120. When the monitoring circuit 610 is disabled, the multiplexer 130 may turn on the data transmission path between the first circuit 10 and the second circuit 20 (step S920).

When the data activity rate of the data transmission path between the first circuit 10 and the second circuit 20 is lower than the threshold (the determination result of step S910 is "No"), the monitoring circuit 610 may perform step S925. In step S925, the control circuit 840 may enable the monitoring circuit 610 and the arbitrary pattern generator 120. After the monitoring circuit 610 is enabled, the monitoring circuit 610 may perform step S930, step S935, step S940 and step S950. After the arbitrary pattern generator 120 is enabled, the arbitrary pattern generator 120 may perform step S945. Step S930, step S935, step S940, step S945 and step S950 depicted in FIG. 9 may be deduced by analogy with reference to related description of step S510, step S523, step S522, step S524 and step S525 depicted in FIG. 5, which is not repeated hereinafter.

Based on different design requirements, the blocks of the monitoring circuit 110, the arbitrary pattern generator 120, the multiplexer 130, the monitoring circuit 610 and (or) the control circuit 840 may be implemented in form of hardware, firmware, or a combination thereof.

In form of hardware, the blocks of the monitoring circuit 110, the arbitrary pattern generator 120, the multiplexer 130, the monitoring circuit 610 and (or) the control circuit 840 may be implemented as logic circuits on an integrated circuit. The related functions of the monitoring circuit 110, the arbitrary pattern generator 120, the multiplexer 130, the monitoring circuit 610 and (or) the control circuit 840 may be implemented as hardware using hardware description languages (e.g., Verilog HDL or VHDL) or other suitable programming languages. For instance, the related functions of the monitoring circuit 110, the arbitrary pattern generator 120, the multiplexer 130, the monitoring circuit 610 and (or) the control circuit 840 may be implemented as various logic blocks, modules and circuits in one or more controllers, microcontrollers, microprocessors, application-specific integrated circuits (ASIC), digital signal processors (DSP), field programmable gate arrays (FPGA) and/or other processing units.

In form of firmware, the blocks of the monitoring circuit 110, the arbitrary pattern generator 120, the multiplexer 130, the monitoring circuit 610 and (or) the control circuit 840 may be implemented as programming codes. For example, the monitoring circuit 110, the arbitrary pattern generator 120, the multiplexer 130, the monitoring circuit 610 and (or) the control circuit 840 may be implemented using common programming languages (e.g., C or C++) or other suitable programming languages. The programming codes may be recorded/stored in a recording medium. The recording medium includes, for example, a read only memory (ROM), a storage device and/or a random access memory (RAM). A computer, a central processing unit (CPU), a controller, a microcontroller or a microprocessor can read and execute the programming codes from the recording medium to achieve the related functions. A "non-transitory computer readable medium" (including a tape, a disk, a card, a semiconductor memory, a programmable logic circuits, etc.) may be used as the recording medium. Moreover, the programming codes may also be provided to the computer (or the CPU) via any transmission medium (a communication network or a broadcast wave). The communication network is, for example, Internet, a wired communication, a wireless communication or other communication media.

In summary, according to the hardware Trojan immunity device in the embodiments of the invention, the monitoring circuit is used to monitor the data activity of the data transmission path. For instance, when the abnormal activity occurs on the data transmission path, the monitoring circuit may control the multiplexer 130 to cut off the data transmission path and to provide the pseudo-random data to the input terminal of the second circuit 20. Accordingly, the hardware Trojan immunity device can maintain data security. When the abnormal activity does not occur on the data transmission path, the monitoring circuit may control the multiplexer 130 to turn on the data transmission path. Accordingly, the hardware Trojan immunity device will not affect a data transmission of the data transmission path between the first circuit 10 and the second circuit 20.

The hardware Trojan immunity device has a small area and is easy to be unitized. The hardware Trojan immunity device can also be packaged into a hardware silicon intellectual property (Hard IP) with an input/output (I/O) circuit. Alternatively, the hardware Trojan immunity device can be separately developed into a standard unit silicon intellectual property. The hardware Trojan immunity device can be configured in different data transmission paths on an integrated circuit chip to achieve Input Protection, Macro-to-Macro Protection, and (or) Output Protection. That is, the hardware Trojan immunity device can be adjusted/configured according to application requirements to achieve the effect of preventing the hardware Trojan from stealing data.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:

1. A hardware Trojan immunity device, disposed in a data transmission path between an output terminal of a first circuit and an input terminal of a second circuit, the hardware Trojan immunity device comprising:
   a multiplexer, wherein a first input terminal of the multiplexer is configured to be coupled to the output terminal of the first circuit, and an output terminal of the multiplexer is configured to be coupled to the input terminal of the second circuit;
   an arbitrary pattern generator, coupled to a second input terminal of the multiplexer to provide pseudo-random data; and
   a monitoring circuit, coupled to a control terminal of the multiplexer, and configured to monitor a data activity of the data transmission path and to control a routing of the multiplexer according to the data activity,
   wherein the multiplexer is configured to selectively turn on the data transmission path between the first circuit and the second circuit, or turn on a transmission path between the arbitrary pattern generator and the second circuit,
   wherein when a data activity rate of the data transmission path is lower than an abnormal activity confidence level, the monitoring circuit controls the multiplexer to turn on the data transmission path between the first circuit and the second circuit; and
   wherein when the data activity rate of the data transmission path exceeds the abnormal activity confidence level, the monitoring circuit controls the multiplexer to turn on the transmission path between the arbitrary pattern generator and the second circuit so as to provide the pseudo-random data to the input terminal of the second circuit.

2. The hardware Trojan immunity device according to claim 1, wherein the monitoring circuit receives an enable signal from a system, when a data activity rate of the data transmission path exceeds a threshold, the monitoring circuit is disabled by the enable signal, and when the data activity rate of the data transmission path is lower than the threshold, the monitoring circuit is enabled by the enable signal.

3. The hardware Trojan immunity device according to claim 2, wherein when the monitoring circuit is disabled, the multiplexer turns on the data transmission path.

4. The hardware Trojan immunity device according to claim 2, wherein the arbitrary pattern generator is controlled by the enable signal, when the data activity rate of the data transmission path exceeds the threshold, the arbitrary pattern generator is disabled by the enable signal, and when the data activity rate of the data transmission path is lower than the threshold, the arbitrary pattern generator is enabled by the enable signal.

5. The hardware Trojan immunity device according to claim 1, further comprising:
   a control circuit, coupled to an enable terminal of the monitoring circuit, and configured to monitor the data activity of the data transmission path and to control the monitoring circuit according to the data activity, wherein when a data activity rate of the data transmission path exceeds a threshold, the control circuit disables the monitoring circuit, and when the data activity rate of the data transmission path is lower than the threshold, the control circuit enables the monitoring circuit.

6. The hardware Trojan immunity device according to claim 5, wherein when the monitoring circuit is disabled, the multiplexer turns on the data transmission path.

7. The hardware Trojan immunity device according to claim 5, wherein the arbitrary pattern generator is controlled by the control circuit, when the data activity rate of the data transmission path exceeds the threshold, the control circuit disables the arbitrary pattern generator, and when the data activity rate of the data transmission path is lower than the threshold, the control circuit enables the arbitrary pattern generator.

8. The hardware Trojan immunity device according to claim 1, wherein
   when a data activity rate of the data transmission path exceeds a threshold, the monitoring circuit controls the multiplexer to turn on the data transmission path;
   when the data activity rate of the data transmission path is lower than the threshold and an abnormal activity confidence level, the monitoring circuit controls the multiplexer to turn on the data transmission path; and
   when the data activity rate of the data transmission path is lower than the threshold and exceeds the abnormal activity confidence level, the monitoring circuit controls the multiplexer to cut off the data transmission path and to provide the pseudo-random data to the input terminal of the second circuit.

9. The hardware Trojan immunity device according to claim 1, wherein the arbitrary pattern generator comprises:
   a flip-flop string;
   a flip-flop, having a data input terminal coupled to a data output terminal of the flip-flop string, wherein a data output terminal of the flip-flop outputs the pseudo-random data; and
   an XNOR gate, having an output terminal coupled to a data input terminal of the flip-flop string, wherein a first input terminal of the XNOR gate is coupled to the data output terminal of the flip-flop, and a second input terminal of the XNOR gate is coupled to the data output terminal of the flip-flop string.

10. The hardware Trojan immunity device according to claim 1, wherein the monitoring circuit comprises:
a flip-flop, having a trigger terminal configured to be coupled to the output terminal of the first circuit; and
an addition circuit, having a first input terminal configured to receive a step value, wherein a second input terminal of the addition circuit is coupled to a data output terminal of the flip-flop, an output terminal of the addition circuit is coupled to a data input terminal of the flip-flop, and an overflow terminal of the addition circuit is coupled to the control terminal of the multiplexer.

11. An operation method of a hardware Trojan immunity device, the hardware Trojan immunity device being disposed in a data transmission path between an output terminal of a first circuit and an input terminal of a second circuit, the operation method comprising:
monitoring a data activity of the data transmission path by a monitoring circuit;
providing pseudo-random data by an arbitrary pattern generator;
controlling a routing of a multiplexer by the monitoring circuit according to the data activity, wherein a first input terminal of the multiplexer is configured to be coupled to the output terminal of the first circuit, a second input terminal of the multiplexer is coupled to the arbitrary pattern generator to receive the pseudo-random data, and an output terminal of the multiplexer is configured to be coupled to the input terminal of the second circuit,
controlling the multiplexer by the monitoring circuit to selectively turn on the data transmission path between the first circuit and the second circuit, or turn on a transmission path between the arbitrary pattern generator and the second circuit,
when a data activity rate of the data transmission path is lower than an abnormal activity confidence level, controlling the multiplexer by the monitoring circuit to turn on the data transmission path between the first circuit and the second circuit; and
when the data activity rate of the data transmission path exceeds the abnormal activity confidence level, controlling the multiplexer by the monitoring circuit to turn on the transmission path between the arbitrary pattern generator and the second circuit so as to provide the pseudo-random data to the input terminal of the second circuit.

12. The operation method according to claim 11, further comprising:
receiving an enable signal from a system by the monitoring circuit;
when a data activity rate of the data transmission path exceeds a threshold, disabling the monitoring circuit by the enable signal; and
when the data activity rate of the data transmission path is lower than the threshold, enabling the monitoring circuit by the enable signal.

13. The operation method according to claim 12, further comprising:
when the monitoring circuit is disabled, turning on the data transmission path by the multiplexer.

14. The operation method according to claim 12, further comprising:
controlling the arbitrary pattern generator by the enable signal;
when the data activity rate of the data transmission path exceeds the threshold, disabling the arbitrary pattern generator by the enable signal; and
when the data activity rate of the data transmission path is lower than the threshold, enabling the arbitrary pattern generator by the enable signal.

15. The operation method according to claim 11, further comprising:
monitoring the data activity of the data transmission path by a control circuit;
controlling the monitoring circuit by the control circuit according to the data activity;
when a data activity rate of the data transmission path exceeds a threshold, disabling the monitoring circuit by the control circuit; and
when the data activity rate of the data transmission path is lower than the threshold, enabling the monitoring circuit by the control circuit.

16. The operation method according to claim 15, further comprising:
when the monitoring circuit is disabled, turning on the data transmission path by the multiplexer.

17. The operation method according to claim 15, further comprising:
controlling the arbitrary pattern generator by the control circuit;
when the data activity rate of the data transmission path exceeds the threshold, disabling the arbitrary pattern generator by the control circuit; and
when the data activity rate of the data transmission path is lower than the threshold, enabling the arbitrary pattern generator by the control circuit.

18. The operation method according to claim 11, further comprising:
when a data activity rate of the data transmission path exceeds a threshold, controlling the multiplexer by the monitoring circuit to turn on the data transmission path;
when the data activity rate of the data transmission path is lower than the threshold and an abnormal activity confidence level, controlling the multiplexer by the monitoring circuit to turn on the data transmission path; and
when the data activity rate of the data transmission path is lower than the threshold and exceeds the abnormal activity confidence level, controlling, by the monitoring circuit, the multiplexer to cut off the data transmission path and to provide the pseudo-random data to the input terminal of the second circuit.

* * * * *